United States Patent
Tamura

Patent Number: 5,347,409
Date of Patent: Sep. 13, 1994

[54] DEVICE MAINTAINING FAST FORWARD/REWIND/PLAY RELATIONSHIP DURING CHANGE OF SELECTED PLAY DIRECTION OF REVERSING TAPE PLAYER

[75] Inventor: Tamotsu Tamura, Oohtawara, Japan

[73] Assignee: Shinwa Kabushiki Kaisha, Tokyo, Japan

[21] Appl. No.: 59,116

[22] Filed: May 7, 1993

[30] Foreign Application Priority Data

May 21, 1992 [JP] Japan .................. 4-128496

[51] Int. Cl.$^5$ .............................. G11B 15/44
[52] U.S. Cl. ........................ 360/74.1; 360/71
[58] Field of Search ................. 360/74.1, 71

[56] References Cited
U.S. PATENT DOCUMENTS
4,956,731  9/1990  Yoshimura ............. 360/74.1 X

FOREIGN PATENT DOCUMENTS
337144  8/1991  Japan .

Primary Examiner—Aristotelis Psitos
Assistant Examiner—James L. Habermehl
Attorney, Agent, or Firm—Thomas R. Morrison

[57] ABSTRACT

A device for fast-forwarding and rewinding a tape includes a base plate supporting a fast-forward and rewind switch. Actuation of the switches rotates a reverse plate. A base plate with forward and reverse operating positions moves the reverse plate between first and second axes of rotation. A switching arm having an idler gear is selectively engageable between a forward and reverse drive system which winds a tape at high speeds. If the device is in a forward mode of operation, the switching arm rotates in the same direction as the reverse plate. If the device is in a reverse mode, the switching arm rotates in a direction opposite the reverse plate.

12 Claims, 9 Drawing Sheets

DEVICE MAINTAINING FAST FORWARD/REWIND/PLAY RELATIONSHIP DURING CHANGE OF SELECTED PLAY DIRECTION OF REVERSING TAPE PLAYER

BACKGROUND OF THE INVENTION

The present invention relates to a device for fast forwarding and rewinding a cassette tape player that is capable of playing tapes in both a forward and reverse mode.

Audio cassette tapes store data on two sides of a magnetic tape. Earlier models of cassette players only played tapes in a single direction. Thus, only one side could be played at any given time. In order to play the other side, the tape had to be removed from the player, turned around and reinserted. Modern tape players are now capable of selectively playing either side without having to remove the tape via forward and reverse operating modes.

Under the prior art, the fast-forward and rewind operations of multi-directional tape players are performed with reference only to forward mode. A drawback of the prior art is that prior to engaging a winding function, an operator must first determine in which direction the tape was running. If the operator fails to check the mode of operation or chooses the incorrect mode, the tape winds in a direction opposite to that intended. These tape players thus require increased user interaction, which can be especially dangerous in the case of car radios where a drivers attention may be distracted from the road to operate the player.

An example of a tape player which overcomes the drawback of the prior art is Japanese Utility Model Publication No. 37144/1991, in which the winding functions operate based on the direction of the tape regardless of the operating mode and with minimal user interaction.

The tape player of Japanese Utility Model Publication No. 37144/1991 contains fast-forward and rewind switches which are respectively provided with switching plates for rotating a switching arm having an idler gear. The structure of the prior art requires that the fast-forward and rewind switches be positioned at a distance from the switching arm, however, which creates a greater possibility of a system breakdown.

SUMMARY OF THE INVENTION

It is accordingly an object of the present invention to overcome the drawbacks of the prior art.

It is a further object of the invention to provide a device for fast-forwarding and rewinding a tape player which fast-forwards and rewinds a cassette tape referenced from the current direction in which the tape is playing.

The present invention contains a base plate which houses fast forward and rewind spring switches having rear ends attached to a rotatably mounted link. Depression of either switch rotates the link, causing a slider attached to the link to move forward and rearward parallel to the base plate. A forked spring fastened to the slider has ends which encompass a catching piece of a rotatably mounted reverse plate.

The reverse plate has an elongated slot which accommodates a shaft of the base plate. The slot has a semicircular catching piece in the center which fits the shaft tightly. A first stub, located below the shaft, protrudes from one side of the reverse plate to engage a switching arm. A second stub located below the first stub protrudes from a second side of the reverse plate to engage a guide plate. The shaft and stubs are disposed in a straight line with the first stub disposed between the shaft and the second stub.

The guide plate has a slot to engage the shaft and an angular slot to engage the second stub of the reverse plate. A catching end connects with a cam portion of a switching plate, which moves between a forward and rear operating position which reflects whether the tape is in forward or reverse play. Movement of the switching plate causes vertical movement in the guide plate, which in turn causes vertical movement of the reverse plate. A spring connected between the switching arm and the reverse plate exerts force downward against the reverse plate and guide plate.

The switching arm has a slot to engage the shaft loosely and a catching hole to engage the first stub of the reverse plate. An idler gear is rotatably mounted at an end of the switching arm. Rotation of the switching arm selectively brings the idler gear into contact with a left reel gear and a left drive gear or a right reel gear and a right drive gear. The drive gears are connected to each other and are driven by a motor. The fast forward and rewind operations of the device engage when the idler gear places a reel gear in contact with its corresponding drive gear.

When the tape player is in forward mode, the switching plate is in a forward position. The cam portion of the switching plate forces the guide plate upward, which carries the reverse plate with it against the pull of the spring. The upward movement of the reverse plate places the shaft in tight engagement with the catching portion of the reverse plate such that the shaft forms the axis of rotation for the reverse plate in all forward mode functions.

When the tape player is in reverse mode, the switching plate is in a reverse position. The cam portion disengages the guide plate, allowing the spring to pull the reverse plate downward. The downward movement of the reverse plate releases the shaft from tight engagement with the catching portion, allowing the second stub of the reverse plate to form the axis of rotation for the reverse plate in all reverse mode functions.

Actuation of either the fast forward switch or the rewind switch rotates the mounted link. The link moves the slider, which in turn rotates the reverse plate in the same direction as the link. If the tape is in forward mode, the reverse plate rotates about the shaft of the base plate. Since the shaft is above the first stub of the reverse plate which connects the switching arm to the plate, the switching arm will rotate in the same direction as the reverse plate. If the tape is in a reverse mode, the reverse plate rotates about its second stub. Since the second stub is below the first stub, rotation of the reverse plate causes the switching arm to rotate in the opposite direction.

When a tape is in forward mode, actuation of the fast-forward switch rotates the link clockwise. The link moves the slider forward, which in turn rotates the reverse plate clockwise about the shaft. This rotates the switching arm clockwise and places the idler gear into contact with the left reel gear and left driving gear to fast-forward the tape with reference to the forward direction. In a similar fashion, actuation of the rewind switch rotates the link, reverse plate and switching arm counter clockwise, bringing the idler gear into contact with the right reel gear and right driving gear to rewind the tape with reference to the forward direction.

When the tape is in reverse mode, actuation of the fast-forward switch rotates the link and reverse plate clockwise. Since the second stub, which is below the first stub, acts as the axis of rotation for the switching arm, the arm rotates counter clockwise to place the idler gear in contact with the right reel gear and right drive gear. This fast-forwards the tape with reference to the reverse direction, which is equivalent to rewinding the tape while in the forward direction.

In a similar fashion, actuation of the rewind lever while in reverse mode rotates the link and reverse plate counter clockwise, while the switching arm rotates clockwise. This brings the idler gear into contact with the left reel gear and left drive gear to rewind the tape with reference to the reverse direction, which is equivalent to fast-forwarding in the forward direction.

Briefly stated, the present invention provides a device for fast-forwarding and rewinding a tape that includes a base plate supporting a fast-forward and rewind switch. Actuation of the switches rotates a reverse plate. A base plate with forward and reverse operating positions moves the reverse plate between first and second axes of rotation. A switching arm having an idler gear is selectively engageable between a forward and reverse drive system which winds a tape at high speeds. If the device is in a forward mode of operation, the switching arm rotates in the same direction as the reverse plate. If the device is in a reverse mode, the switching arm rotates in a direction opposite the reverse plate.

According to an embodiment of the invention, there is provided a device for fast-forwarding and rewinding a cassette tape player, comprising: first and second switches, means for detecting a direction of play, a plate having first and second operating positions and a stub, means for rotating the plate in one of first and second directions responsive to actuation of one of the first and second switches, respectively, means for placing the plate in one of the first and second operating positions responsive to the means for detecting, a switching arm rotatably mounted on the stub and having forward and reverse rotation positions, an idler gear rotatably mounted at an end of the switching arm, the plate including means for rotating the switching arm in a direction parallel to the one of first and second directions if the plate is in the first operating position, and the plate including means for rotating the arm in an opposite direction to the one of first and second directions if the plate is in the second operating position.

According to a feature of the invention, there is provided an apparatus for fast-forwarding and rewinding a cassette tape player, comprising: a base plate having a shaft, a fast-forward switch, a rewind switch, a rotatable reverse plate having first and second operating positions and first and second stubs, the first operating position having the shaft as an axis of rotation for the reverse plate, the second operating position having the second stub as an axis of rotation for the reverse plate, a switching plate having forward and reverse operating positions, means, responsive to the operating position of the switching plate, for placing the reverse plate in one of the first and second operating positions, means for rotating the reverse plate in one of first and second directions, responsive to actuation of one of the fast-forward and rewind switches, respectively, a switching arm rotatably mounted on the first stub having an idler gear rotatably mounted at an end of the switching arm, and the reverse plate including means for rotating the switching arm in a direction parallel to the one of first and second directions if the plate is in the first operating position, the reverse plate including means for rotating the switching arm in an opposite direction to the one of first and second directions if the reverse plate is in the second operating position.

According to a further feature of the invention, there is provided an apparatus for fast-forwarding and rewinding a tape, comprising, a base plate having a shaft, a fast-forward switch, a rewind switch, a link rotatably mounted on the base plate connected to the fast-forward switch and the rewind switch, wherein actuation of one of the fast-forward and rewind switches rotates the link in one of counterclockwise and clockwise directions, respectively, a slider mounted on the base plate and connected to the link, effective to move between fast-forward and rewind operating positions in response to rotation of the link, a rotatable reverse plate having first and second stubs and first and second operating positions, a switching plate mounted on the base plate having forward and reverse operating positions, means for placing the reverse plate in the first and second operating positions responsive to the switching plate being in forward and reverse operating positions, respectively, the shaft being a first axis of rotation for the reverse plate when in the first operating position, the second stub being a second axis of rotation for the reverse plate when in the second operating position, the slider having a forked spring effective for rotating the reverse plate about one of first and second axes of rotation, a switching arm rotatably mounted on the first stub and having an idler gear at an end thereof, the revere plate having means for rotating the switching arm in a direction parallel to the reverse plate if the reverse plate is in the first operating position, the revere plate having means for rotating the switching arm in a direction opposite to the reverse plate if the reverse plate is in the second operating position, forward and reverse drive systems, and the switching arm being selectively engageable between the forward and reverse drive systems.

According to a still further feature of the invention, there is provided a device for fast-forwarding and rewinding a cassette tape player, comprising: first and second switches, a rotatable plate having first and second axes, forward and reverse winding means, means for selecting one the first and second axes of rotation of the plate, the plate including means for selectively moving an idler gear into contact with one of the forward and reverse winding means, means for selecting one of the forward and reverse winding means based on first and second combinations of elements, respectively, the first combination of elements including actuation of the first switch and the first outcome of the means for detecting, the first combination of elements including actuation of the second switch and the second outcome of the means for detecting, the second combination of elements including actuation of the first switch and the second outcome of the means for detecting, and the second combination of elements including actuation of the second switch and the first outcome of the means for detecting.

According to a still further feature of the invention, there is provided a device for controlling a tape of a tape player, comprising: a forward drive, a reverse drive, an idler, a first idler control axis, a second idler control axis, first means, responsive to operation of the forward drive, for rotating the idler about the first idler control axis, second means, responsive to operation of the reverse drive, for rotating the idler about the second idler control axis, a forward reel gear, a reverse reel gear, a fast forward control, and a rewind control, means, resonsive to the operation of the forward drive, and operation of the forward control, for rotating the idler about the first idler control axis to a position driving the forward reel gear in a forward direction, means, resonsive to the operation of the forward drive, and operation of the rewind control, for rotating the idler about the first idler control axis to a position driving the reverse reel gear in a reverse direction, means, resonsive to the operation of the reverse drive, and operation of the forward control, for rotating the idler about the second idler control axis to a position driving the reverse reel gear in a reverse direction, and means, resonsive to the operation of the reverse drive, and operation of the reverse control, for rotating the idler about the second control axis to a position driving the forward reel gear in a forward direction.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
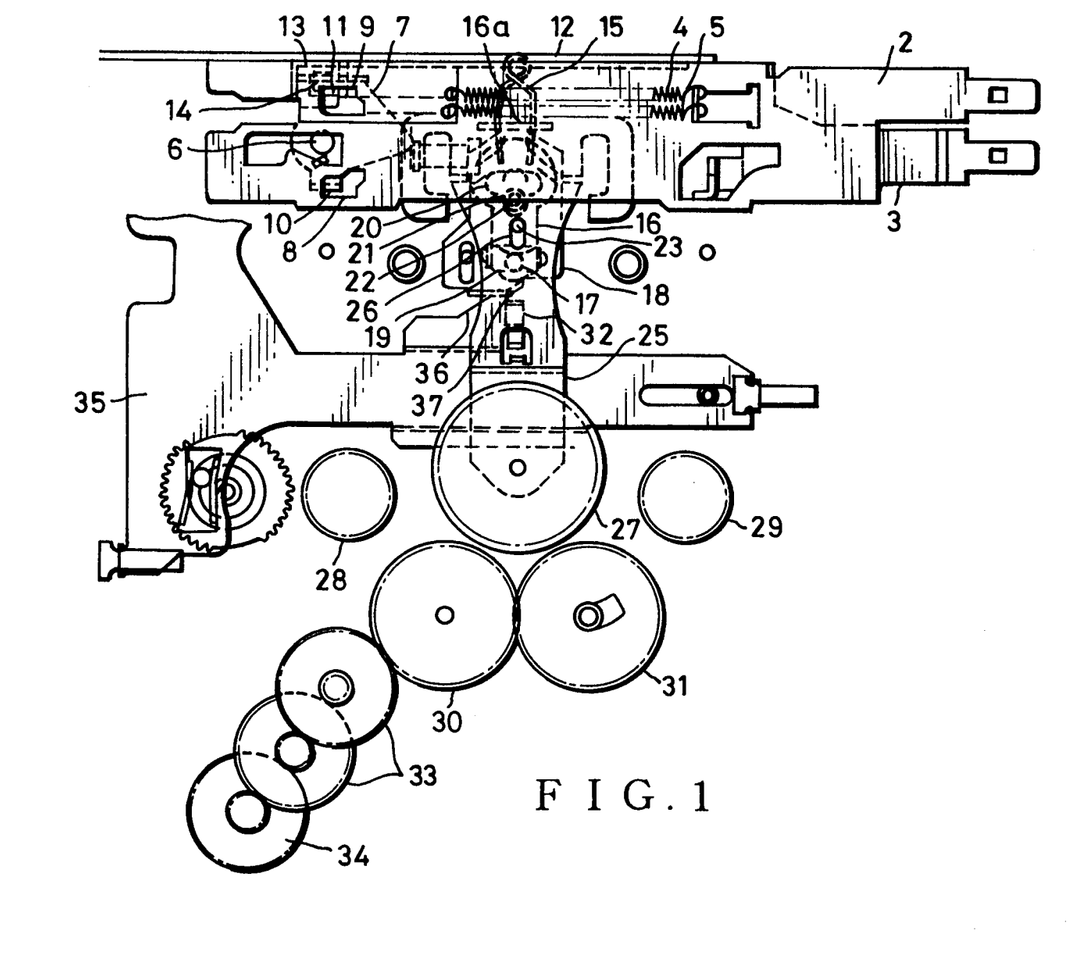
FIG. 1 is a schematic diagram of a tape drive mechanism according to an embodiment of the invention, shown in forward direction mode.
Figure 2:
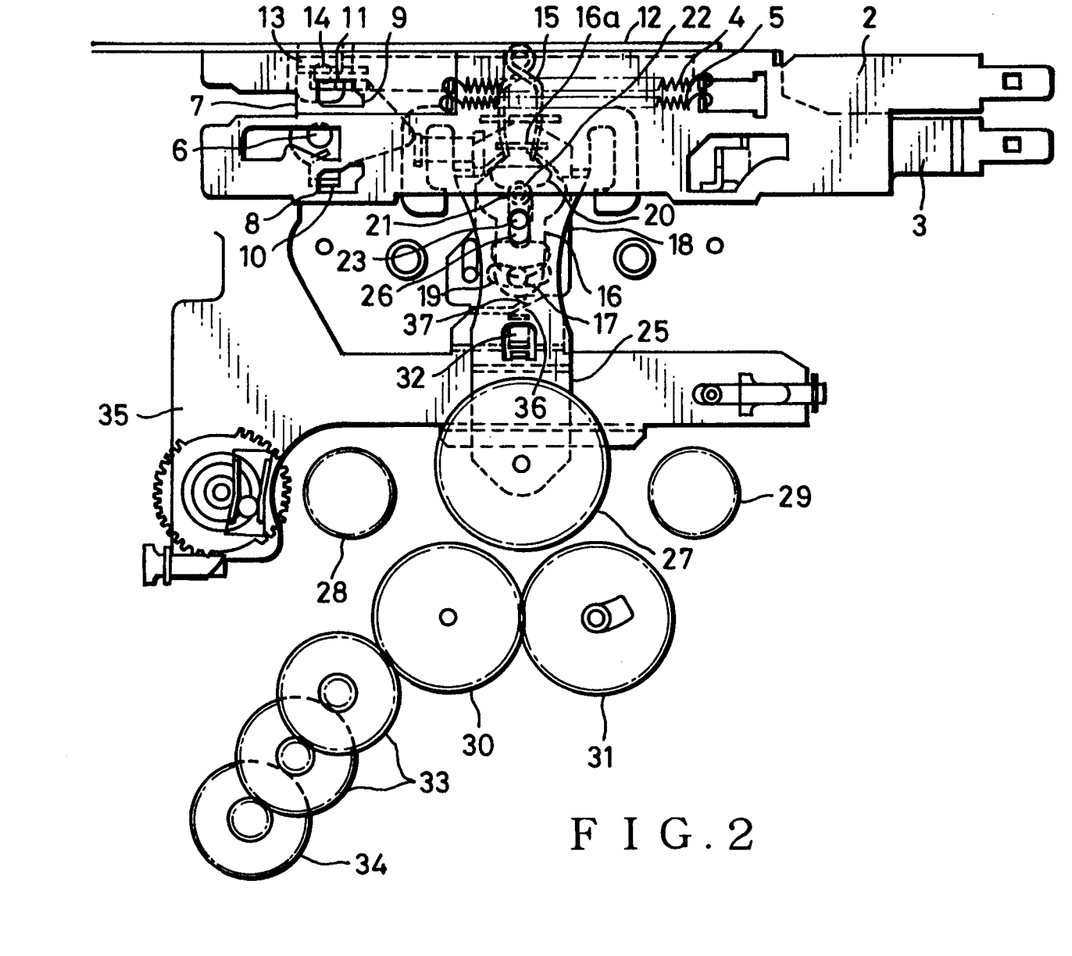
FIG. 2 is a schematic diagram of the preferred embodiment of the present invention, shown in reverse direction mode.
Figure 7:
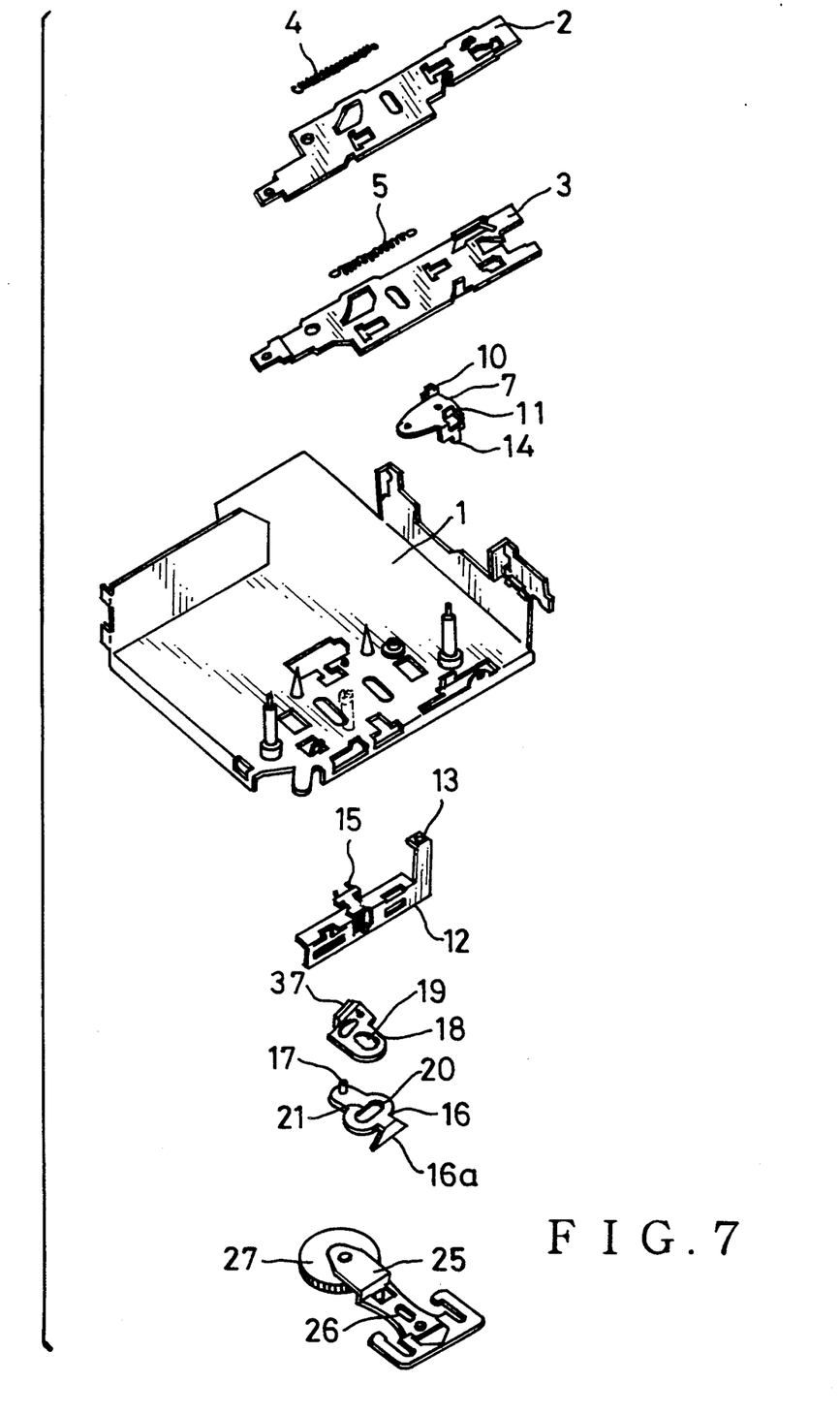
FIG. 7 is an exploded perspective view of the preferred embodiment of the present invention.

Referring to FIG. 1, 2 and 7, a base plate 1 houses a fast-forward spring switch 2 and a rewind spring switch 3. Switches 2 and 3 can advance individually into base 1 under the force of springs 4 and 5, respectively. Switches 2 and 3 have first and second catching holes 8 and 9 bored at an end thereof, respectively.

A link 7, rotatably mounted on a shaft 6 from base 1, has first and second catching portions 10 and 11 which catch first and second catching holes 8 and 9, respectively. Actuation of either switch 2 or 3 rotates link 7 about shaft 6.

A slider 12 is slidably mounted to the top of base plate 1. A third catching portion 13 of link 7 engages a third catching hole 14 bored in slider 12. Rotation of link 7 causes slider 12 to move in a direction parallel to switches 2 and 3. A forked spring 15 is fastened to slider 12. The ends of forked spring 15 engage a catching piece 16a of a reverse plate 16. Reverse plate 16 projects a first stub 17 below a first elongated slot 20. First elongated slot 20 has a semicircular catching portion 21 bored through plate 16. Catching portion 21 loosely engages a shaft 22 projecting from base plate 1. A second stub 23 projects from on opposite side of plate 16 and is positioned below slot 20 and above first stub 17.

An arc shaped hole 19a bored into a guide plate 18 engages first stub 17. A second elongated slot 19 in guide plate 18 engages shaft 22. Slot 19 allows guide plate 18 to slide orthogonally to slider 12. Pressure on a catching edge 37 moves guide plate 18 along slot 19.

A switching arm 25 is rotatably mounted on shaft 22. Switching arm 25 contains a third elongated slot 26 which engages second stub 23. An idler gear 27 is rotatably mounted at an end of arm 25.

Idler gear 27 can selectively engage a first reel gear 28 and a first drive gear 30 or a second reel gear 29 and a second drive gear 31 by the rotation of switching arm 25. First and second driving gears 30 and 31 interlock. Both are driven by a motor 34 connected to first drive gear 30 by gearing mechanism 33.

A direction switching plate 35 is attached to base plate 1. Switching plate 1 moves parallel to slider 12. A cam portion 36 engages catching edge 37 of guide plate 18. Movement of switching plate 35 between forward and reverse operating positions moves guide plate 18 upward and downward, respectively. A spring 32 connected between switching arm 25 and plate 16 applies downward force on guide plate 18, forcing edge 37 to engage cam portion 36.

Referring now exclusively to FIG. 1, a tape is played in a forward mode, by placing switching plate 35 in its forward operating position shown. Cam portion 36 forces guide plate 18 upward, which in turn forces plate 16 upward via first stub 17. The upward movement causes semicircular catching portion 21 of slot 20 to tightly engage shaft 22. As a result, shaft 22 acts as a first axis of rotation for plate 16 while the device is in forward mode.

Referring now exclusively to FIG. 2, a tape is played in a reverse mode, placing switching plate 35 to its reverse operating position. Cam portion 36 disengages catching edge 37, allowing spring 32 to pull plate 16 downward. The downward movement releases shaft 22 from tight engagement with catching portion 21. As a result, first stub 17 acts as a second axis of rotation for plate 16 while the device is in reverse mode.

Figure 3:
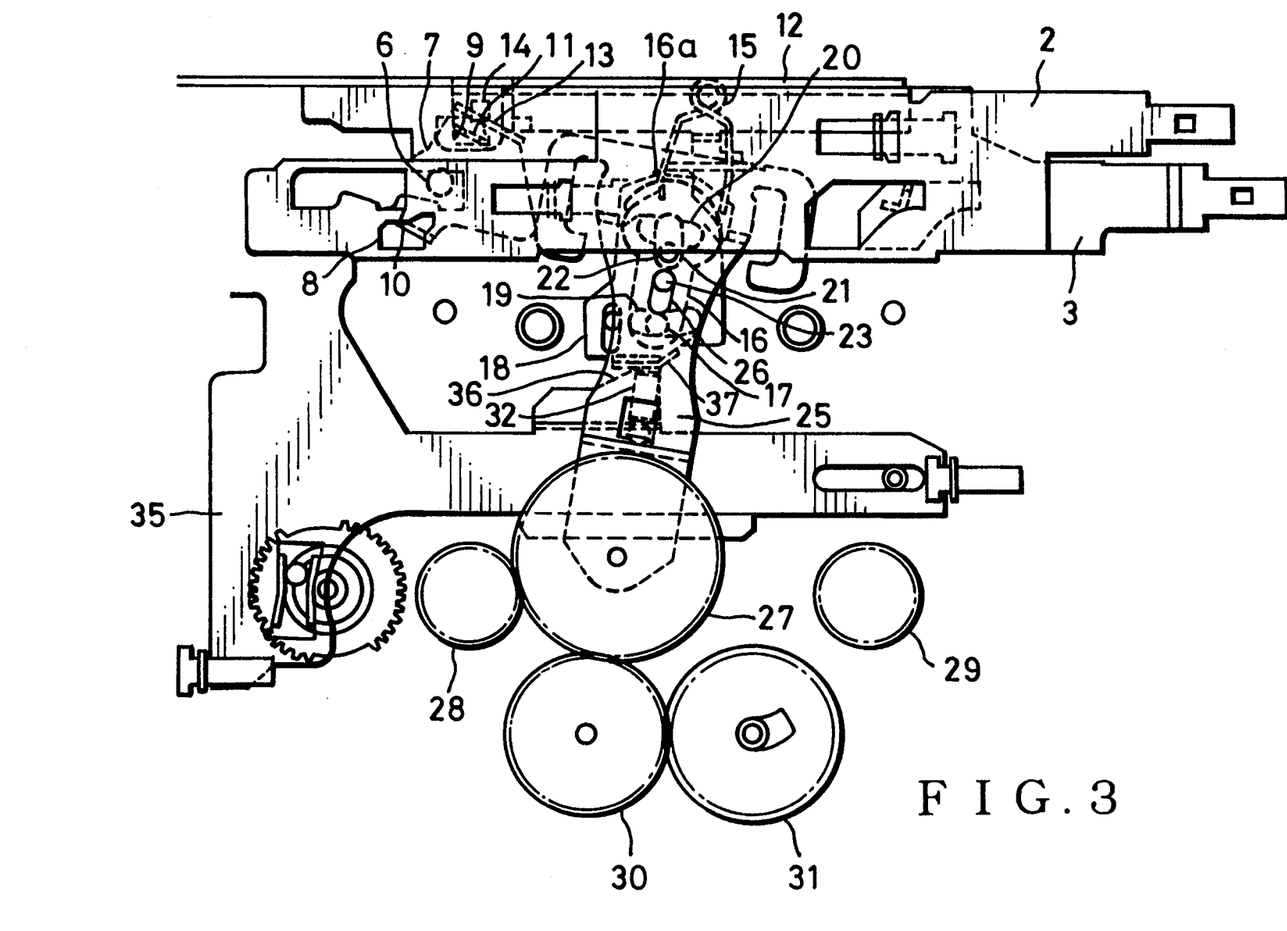
FIG. 3 is a schematic diagram of the preferred embodiment of the present invention, shown in forward direction mode with the fast-forward operation engaged.

Referring now to FIG. 3, fast-forward switch 2 is pressed while the device is in forward mode. Link 7 rotates clockwise, causing slider 12 to move forward. Forked spring 15 of slider 12 rotates plate 16, which is rotating about shaft 22 due to forward mode operation, clockwise by applying pressure to catching piece 16a. Rotation of catching plate 16 about shaft 22 causes switching arm 25 to rotate clockwise via second stub 23. The clockwise motion of switching arm 25 brings idler gear 27 into contact with first reel gear 28 and first drive gear 30 which form a forward drive system, thereby fast-forwarding the tape at high speed with reference to the forward mode.

Figure 4:
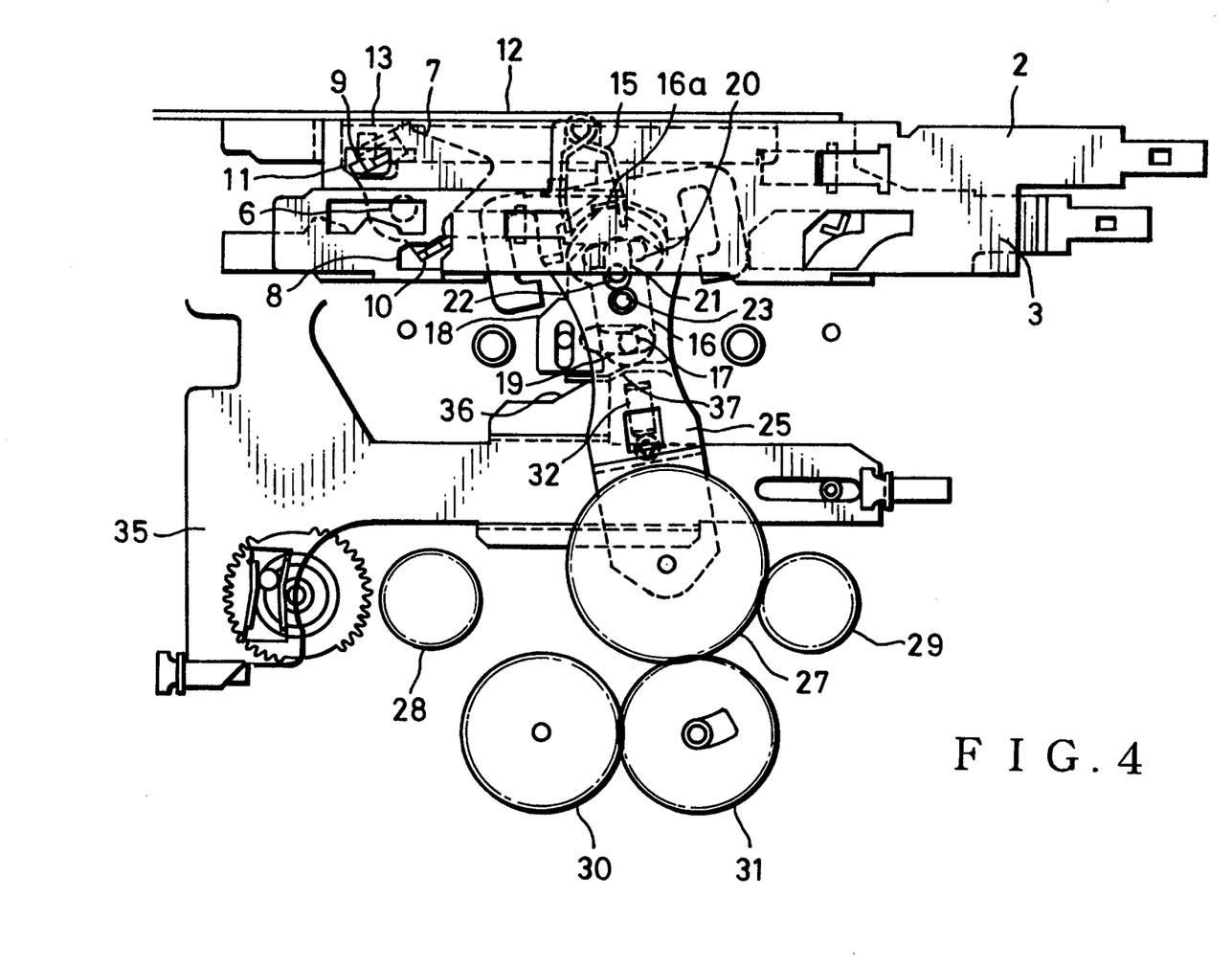
FIG. 4 is a schematic diagram of the preferred embodiment of the present invention, shown in forward direction mode with the rewind operation engaged.

Referring now to FIG. 4, rewind switch 3 is pressed while the device is in forward mode. Link 7 rotates counterclockwise causing slider 12 to move rearward. Forked spring 15 of slider 12 rotates plate 16, which is rotating about shaft 22 due to forward mode, counter clockwise about shaft 22 by applying pressure to catching piece 16a. Rotation of catching plate 16 about shaft 22 causes switching arm 25 to rotate counterclockwise via second stub 23. The counter clockwise motion of switching arm 25 brings idler gear 27 into contact with a second reel gear 29 and second drive gear 31 which form a reverse drive system, thereby rewinding the tape at high speed with reference to forward mode.

Figure 5:
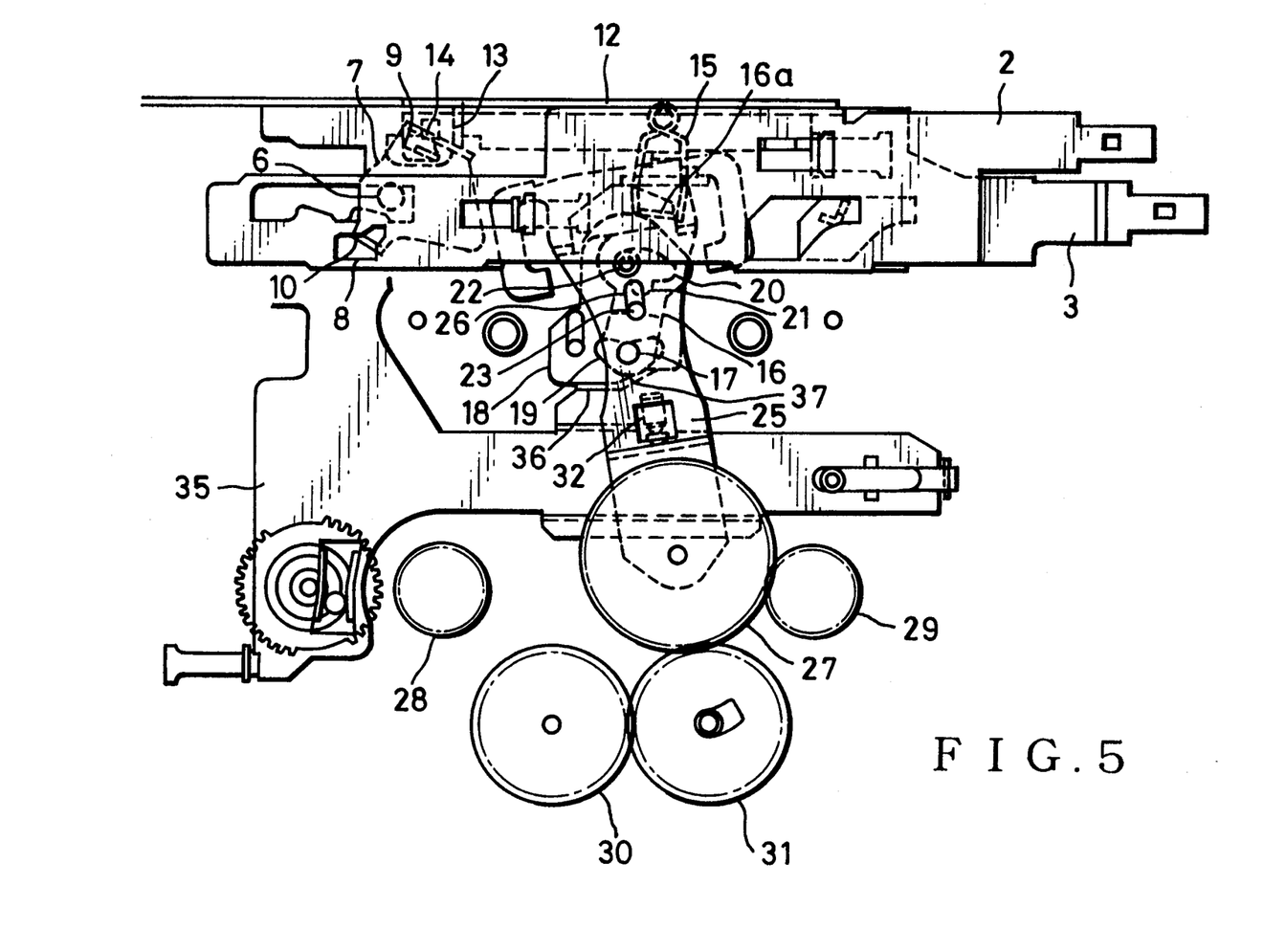
FIG. 5 is a schematic diagram of the preferred embodiment of the present invention, shown in reverse direction mode with the fast-forward operation engaged.

Referring now to FIG. 5, fast-forward switch 2 is pressed while the device is in reverse mode. Link 7 rotates clockwise causing slider 12 to move forward. Forked spring 15 of slider 12 rotates plate 16, which is rotating about first stub 17 due to reverse mode, clockwise by applying pressure to catching piece 16a. Rotation of catching plate 16 about first stub 17 causes switching arm 25 to rotate opposite plate 16 in a counter clockwise direction via second stub 23. The counterclockwise motion of switching arm 25 brings idler gear 27 into contact with second reel gear 29 and second drive gear 31, thereby fast-forwarding the tape at high speed with reference to the reverse mode.

Figure 6:
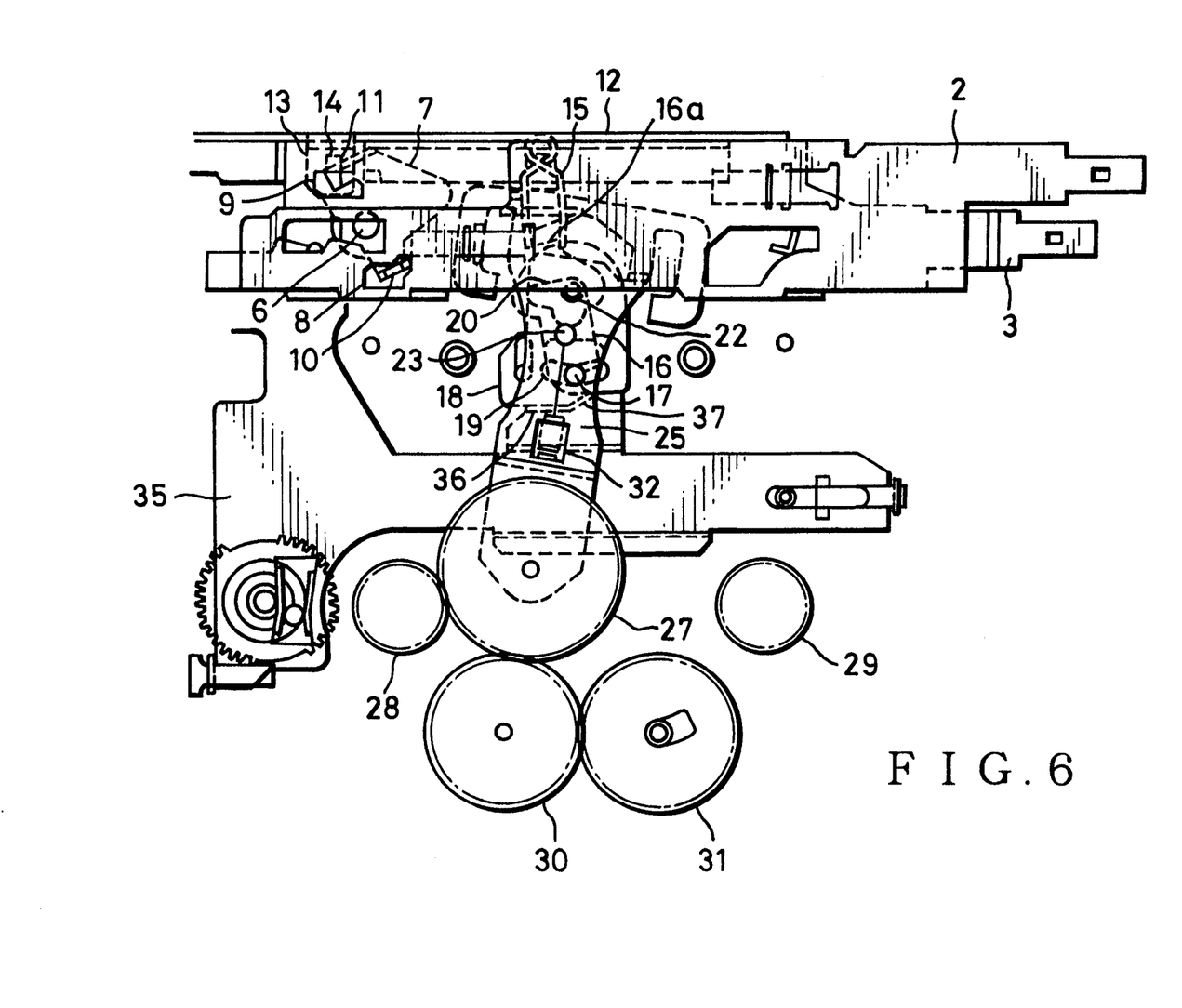
FIG. 6 is a schematic diagram of the preferred embodiment of the present invention, shown in reverse direction mode with the rewind operation engaged.

Referring now to FIG. 6, rewind switch 3 is pressed while the device is in reverse mode. Link 7 rotates counterclockwise causing slider 12 to move rearward. Forked spring 15 of slider 12 rotates plate 16, which is rotating about first stub 17 due to forward mode, counterclockwise about first stub 17 by applying pressure to catching piece 16a. Rotation of catching plate 16 about first stub 17 causes switching arm 25 to rotate opposite plate 16 in a clockwise direction via second stub 23. The clockwise motion of switching arm 25 brings idler gear 27 into contact with first reel gear 28 and first drive gear 30, thereby rewinding the tape at high speed with reference to reverse mode.

As described above, the axis of rotation of plate 16 alternates between shaft 22 and first stub 17, depending on whether the tape is playing in the forward or reverse mode. When in forward mode, plate 16 and switching arm 25 rotate in the same direction. When in reverse mode, switching arm 25 and plate 16 rotate in opposite directions. The present invention is thus simpler to operate than conventional tape players, since a user may fast-forward or rewind the tape without having to confirm the mode of operation.

Figure 8:
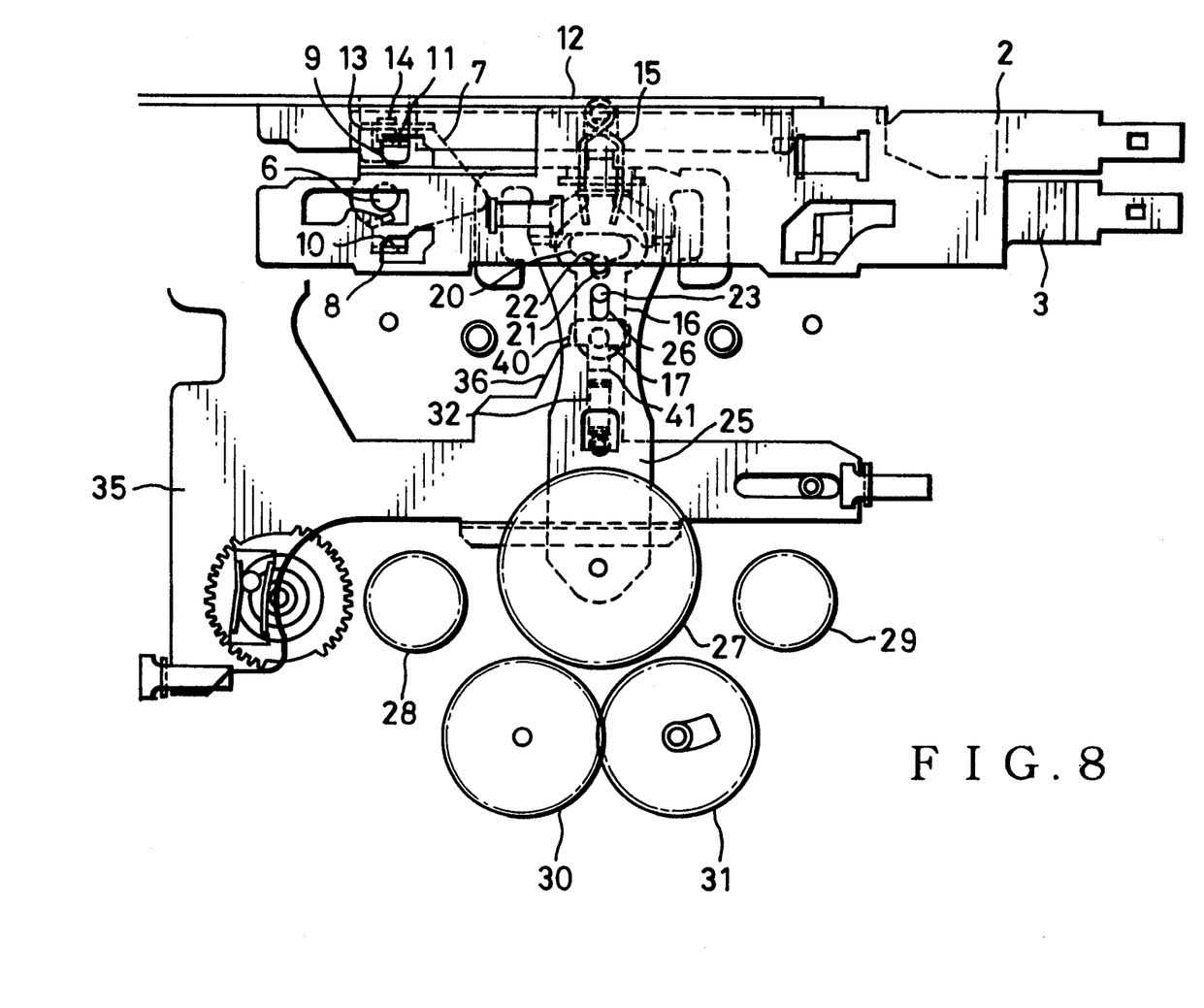
FIG. 8 is a schematic diagram of a second embodiment of the present invention, shown in forward direction mode.
Figure 9:
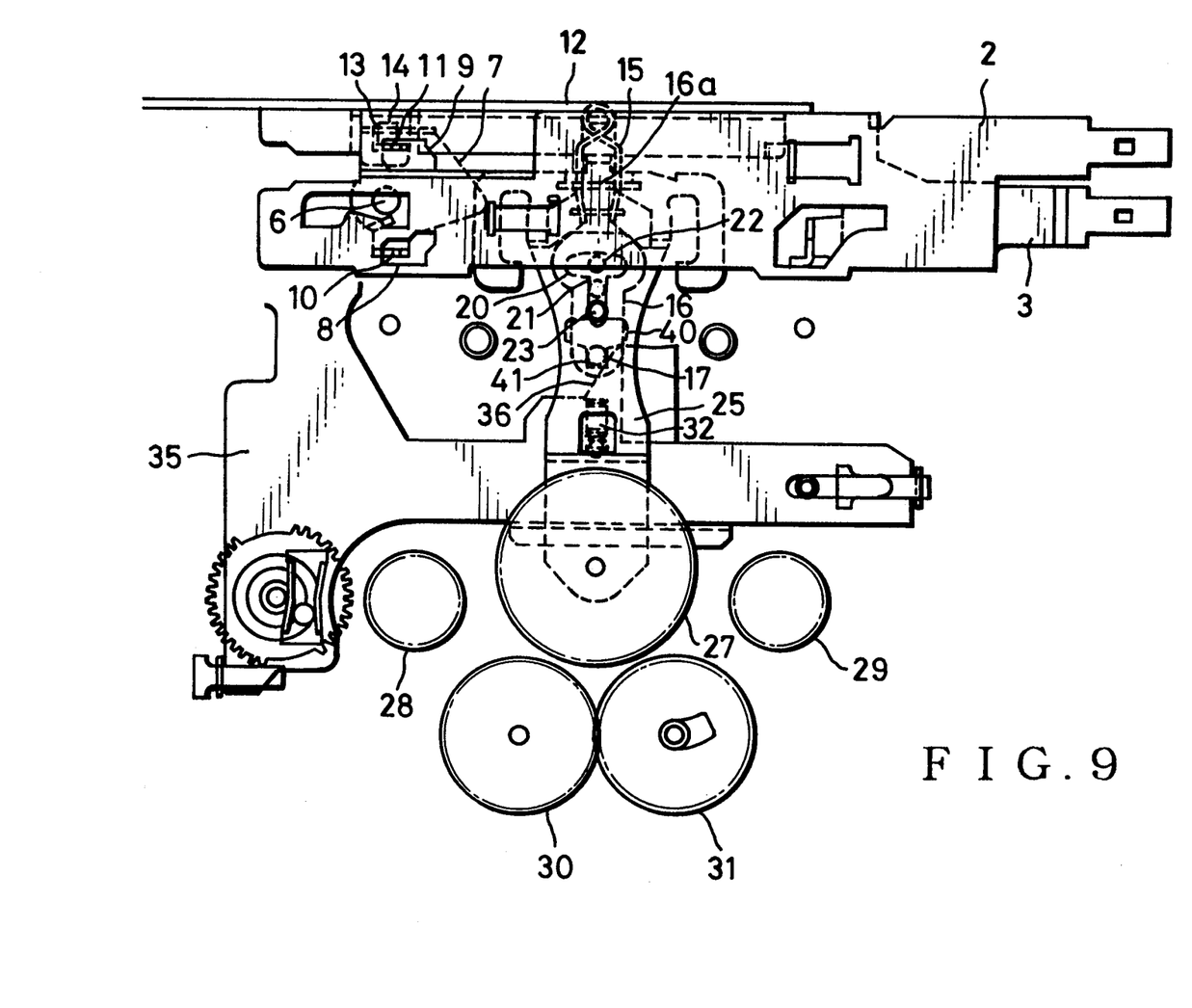
FIG. 9 is a schematic diagram of a second embodiment of the present invention, shown in reverse direction mode.

FIGS. 8-9 illustrate a second embodiment of the invention wherein guide plate 18 of the prior embodiment is omitted. Referring now to Fig. 8, a tape is played in a forward mode, placing switching plate 35 in its forward operating position. Cam portion 36, which is now engaged with first stub 17, forces it upward, causing shaft 22 to tightly engage semicircular catching portion 21 of slot 20 while first stub 17 is loosely engaged in fourth slot 40 having a fourth catching portion 41. As a result, shaft 22 acts as the axis of rotation for reverse plate 16 while the device is in forward mode.

Referring now FIG. 9, a tape is played in a reverse mode, placing switching plate 35 in its reverse operating position. Cam portion 36 disengages first stub 17, which in turn allows spring 32 to pull plate 16 downward. The downward movement releases shaft 22 from engagement with catching portion 21 while tightly engaging first stub 17 with fourth catching portion 41. As a result, first stub 17 acts as the axis of rotation for plate 16 while the device is in reverse mode.

Although the embodiments described above call for switching reverse plate 16 between first and second axes of rotation via switching plate 35, other switching mechanisms, such as a pinch rollers, may be used without departing from either the scope or spirit of the invention as defined in the appended claims.

According to the present invention, tapes can be rewound and fast-forwarded with reliability and without regard to the mode of play.

Having described the preferred embodiments of the invention with reference tot he accompanying drawings, it is to be understood that the invention is not limited to those practicing embodiments, and that various changes and modifications may be effected therein by one skilled in the art without departing from either the scope or spirit of the present invention as defined in the appended claims.

What is claimed is:

1. A device for fast-forwarding and rewinding a cassette tape player, comprising:
   first and second switches;
   means for detecting a direction of play;
   a plate having first and second operating positions and a stub;
   means for rotating said plate in one of first and second directions responsive to actuation of one of said first and second switches, respectively;
   means for placing said plate in one of said first and second operating positions responsive to said means for detecting;
   a switching arm rotatably mounted on said stub and having forward and reverse rotation positions;
   an idler gear rotatably mounted at an end of said switching arm;
   said plate including means for rotating said switching arm in a direction parallel to said one of first and second directions if said plate is in said first operating position; and
   said plate including means for rotating said arm in an opposite direction to said one of first and second directions if said plate is in said second operating position.

2. An apparatus according to claim 1 further comprising;
   first and second reel gears;
   first and second drive gears;
   said first and second drive gears being in contact with each other;
   said first reel gear being disposed from said first drive gear such that said forward operating position of said switching arm places said idler gear in contact with said first reel gear and said first drive gear;
   said second reel gear being disposed from said second drive gear such that said reverse operating position of said switching arm places said idler gear in contact with said second reel gear and said second drive gear; and
   means for rotating one of said first and second drive gears.

3. An apparatus according to claim 1, wherein said means for placing further comprises a guide plate.

4. An apparatus according to claim 1, wherein said means for rotating further comprises;
   a rotatably mounted link;
   a slider having an end connected to said link;

a forked spring connected to said slider;
a catching piece on said plate; and
said forked spring enclosing said catching piece.

5. An apparatus for fast-forwarding and rewinding a cassette tape player, comprising;
   a base plate having a shaft;
   a fast-forward switch;
   a rewind switch;
   a rotatable reverse plate having first and second operating positions and first and second stubs;
   said first operating position having said shaft as an axis of rotation for said reverse plate;
   said second operating position having said second stub as an axis of rotation for said reverse plate;
   a switching plate having forward and reverse operating positions;
   means, responsive to said operating position of said switching plate, for placing said reverse plate in one of said first and second operating positions;
   means for rotating said reverse plate in one of first and second directions, responsive to actuation of one of said fast-forward and rewind switches, respectively;
   a switching arm rotatably mounted on said first stub having an idler gear rotatably mounted at an end of said switching arm; and
   said reverse plate including means for rotating said switching arm in a direction parallel to said one of first and second directions if said plate is in said first operating position
   said reverse plate including means for rotating said switching arm in an opposite direction to said one of first and second directions if said reverse plate is in said second operating position.

6. An device for fast-forwarding and rewinding a cassette tape player according to claim 5, further comprising:
   a forward drive system including first reel gears and first drive gear;
   a reverse drive system including second reel gear and second drive gear;
   said first and second drive gears being in contact with each other;
   said switching arm being selectively engageable between said forward drive system and said reverse drive system; and
   means for winding a tape in one of forward and reverse directions responsive to said switching arm being engaged with one of said forward and reverse drive systems.

7. An apparatus according to claim 5, wherein said means for placing includes a guide plate.

8. An apparatus according to claim 5, wherein said means for rotating further comprises;
   a rotatably mounted link;
   a slider having an end connected to said link;
   a forked spring connected to said slider;
   a catching piece on said plate; and
   said forked spring enclosing said catching piece.

9. An apparatus for fast-forwarding and rewinding a tape, comprising;
   a base plate having a shaft;
   a fast-forward switch;
   a rewind switch;
   a link rotatably mounted on said base plate connected to said fast-forward switch and said rewind switch, wherein actuation of one of said fast-forward and rewind switches rotates said link in one of counter-clockwise and clockwise directions, respectively;
   a slider mounted on said base plate and connected to said link, effective to move between fast-forward and rewind operating positions in response to rotation of said link;
   a rotatable reverse plate having first and second stubs and first and second operating positions;
   a switching plate mounted on said base plate having forward and reverse operating positions;
   means for placing said reverse plate in said first and second operating positions responsive to said switching plate being in forward and reverse operating positions, respectively;
   said shaft being a first axis of rotation for said reverse plate when in said first operating position;
   said second stub being a second axis of rotation for said reverse plate when in said second operating position;
   said slider having a forked spring effective for rotating said reverse plate about one of first and second axes of rotation;
   a switching arm rotatably mounted on said first stub and having an idler gear at an end thereof;
   said reverse plate having means for rotating said switching arm in a direction parallel to said reverse plate if said reverse plate is in said first operating position;
   said reverse plate having means for rotating said switching arm in a direction opposite to said reverse plate if said reverse plate is in said second operating position;
   forward and reverse drive systems; and
   said switching arm being selectively engageable between said forward and reverse drive systems.

10. An apparatus according to claim 9, wherein said drive systems further comprises;
    said forward drive system having a first reel gear and a first drive gear;
    said reverse drive system having a second reel gear and a second drive gear; and
    said first and second drive gears interlocking each other.

11. A device for fast-forwarding and rewinding a cassette tape player, comprising:
    first and second switches;
    a rotatable plate having first and second axes;
    forward and reverse winding means;
    means for selecting one said first and second axes of rotation of said plate;
    said plate including means for selectively moving an idler gear into contact with one of said forward and reverse winding means;
    means for selecting one of said forward and reverse winding means based on first and second combinations of elements, respectively;
    said first combination of elements including actuation of said first switch and said first outcome of said means for detecting;
    said first combination of elements including actuation of said second switch and said second outcome of said means for detecting;
    said second combination of elements including actuation of said first switch and said second outcome of said means for detecting; and
    said second combination of elements including actuation of said second switch and said first outcome of said means for detecting.

12. A device for controlling a tape of a tape player, comprising:
- a forward drive;
- a reverse drive;
- an idler;
- a first idler control axis;
- a second idler control axis;
- first means, responsive to operation of said forward drive, for rotating said idler about said first idler control axis;
- second means, responsive to operation of said reverse drive, for rotating said idler about said second idler control axis;
- a forward reel gear;
- a reverse reel gear;
- a fast forward control, and a rewind control;
- means, responsive to said operation of said forward drive, and operation of said forward control, for rotating said idler about said first idler control axis to a position driving said forward reel gear in a forward direction;
- means, responsive to said operation of said forward drive, and operation of said rewind control, for rotating said idler about said first idler control axis to a position driving said reverse reel gear in a reverse direction;
- means, responsive to said operation of said reverse drive, and operation of said forward control, for rotating said idler about said second idler control axis to a position driving said reverse reel gear in a reverse direction; and
- means, responsive to said operation of said reverse drive, and operation of said reverse control, for rotating said idler about said second control axis to a position driving said forward reel gear in a forward direction.

* * * * *